H. WILSON.
BRAKING MECHANISM.
APPLICATION FILED DEC. 6, 1913.

1,118,833.

Patented Nov. 24, 1914.

Witnesses
Frank Hough
D. W. Gould.

Inventor
Henry Wilson,
By Victor J. Evans
Attorney

UNITED STATES PATENT OFFICE.

HENRY WILSON, OF LUDLOW, MASSACHUSETTS.

BRAKING MECHANISM.

1,118,833.  Specification of Letters Patent.  Patented Nov. 24, 1914.

Application filed December 6, 1913. Serial No. 805,112.

*To all whom it may concern:*

Be it known that I, HENRY WILSON, a citizen of Germany, and a subject of the German Emperor, residing at Ludlow, in the county of Hampden and State of Massachusetts, have invented new and useful Improvements in Braking Mechanism, of which the following is a specification.

The invention relates to a braking mechanism designed particularly for use with vehicles equipped with an air brake system, and comprehends more particularly a braking element to be actuated in such system and to coöperate with rails or track.

The main object of the present invention is the provision of a braking mechanism supported beneath the car and including a brake shoe designed for coöperation with the rail, the shoe carrying element being normally held in a position to space the shoe from the rail, a lever operated under the pressure in the brake cylinder serving to force the shoe into contact with the rail with the desired braking pressure.

The invention in the preferred form of details will be described in the following specification, reference being had particularly to the accompanying drawings, in which:—

Figure 1:
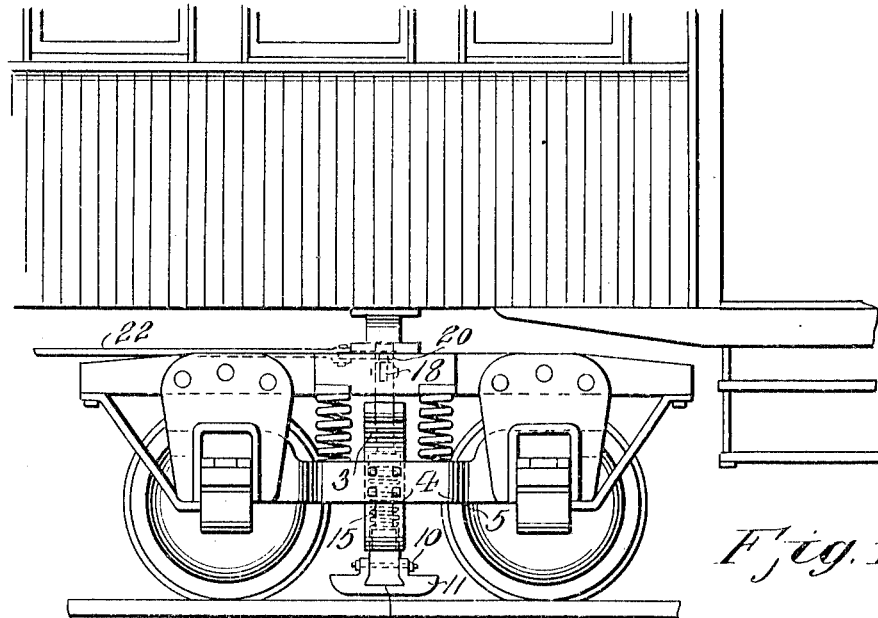
Figure 2:
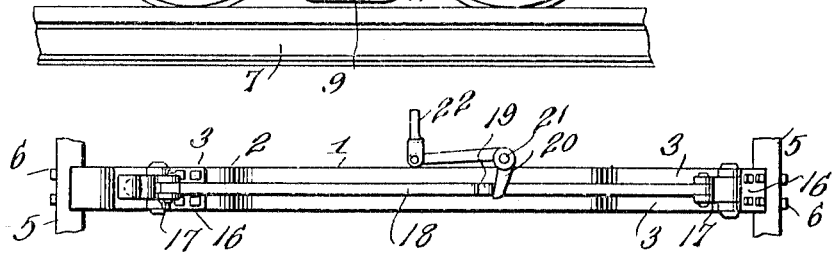
Figure 3:
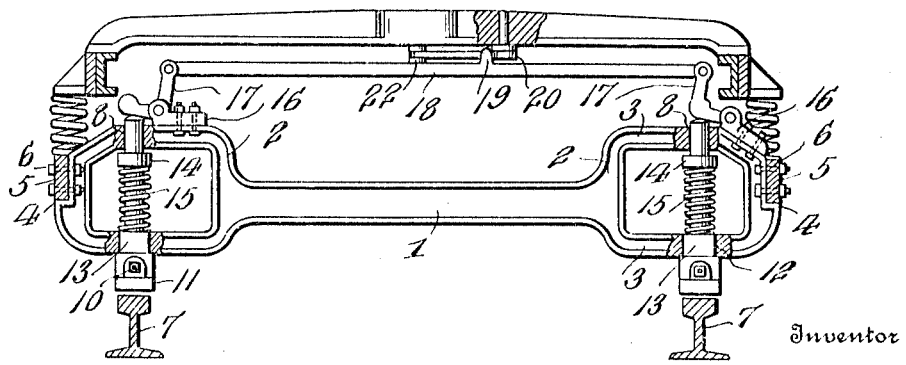

Figure 1 is a view in side elevation illustrating the application of the improvement. Fig. 2 is a plan illustrating the operating means for the brake mechanism. Fig. 3 is a sectional view partly in elevation illustrating the improved braking mechanism.

In the accompanying drawings, the improved brake mechanism is shown as including a yoke 1 having skeleton rectangular ends 2 including upper and lower parallel bars 3, the extreme outer ends of the yokes being recessed at 4 to receive the usual side bars 5 of the truck, to which side bars the yoke is securely bolted at 6. Movably mounted in appropriate bearing openings in the respective bars 3 of the yoke immediately above each rail 7 is a rod 8, the lower end of which below the yoke is provided with a head 9 to which, through the medium of the pivot bolt 10, is secured a brake shoe 11, of such material and form as to readily coöperate with the tread surface of the rail. The bearing opening 12 in the lower bar 3 of the yoke is rectangular in shape and that portion 13 of the rod 8 passing therethrough is of corresponding shape in order to prevent rotation of the rod so that the brake shoe may be at all times in operative position above the rail. A collar 14 is secured upon each of the rods 8 and a coil spring 15 is interposed between the collar and lower bar 3, and serves to normally hold the rod 8 in such position as to maintain the brake shoe slightly elevated from the rail.

Brackets 16 are secured upon the terminal portions 3 of the yoke immediately adjacent the upper bearing openings for the rod 8, and in these brackets are mounted angle levers 17 designed to bear upon the upper ends of the rods 8. These angle levers are connected by the bar 18 formed at an appropriate point in its length with an upstanding projection 19, and an angle lever 20 pivotally mounted at 21 upon appropriate part of the car frame or truck structure is connected to a rod 22 and the levers operated by the brake cylinder. The connection between the lever 20 and the projection 19 is such that the lever, when operated in one direction, will move the bar 18 laterally, with the effect to depress the rods 8 and apply the brake shoes to the rails, the reverse movement of the parts when freed from the influence of the air controlled means being through the medium of the springs 15.

What is claimed is:—

1. A braking mechanism including a yoke secured to the truck, rods having spaced bearings in the yoke, a spring encircling the rods between the bearings and operating the rods in one direction, levers carried by the yokes and bearing upon the rods, a bar connecting the levers, said bar being formed with a projection, a lever pivotally connected to the car truck and having one end adapted to engage said projection and means for actuating said last mentioned lever.

2. A braking mechanism including a yoke secured to the truck members intermediate the wheels and projected transversely of the truck, said yoke carrying braking elements, a lever for each of said elements, a rod connecting said levers and a projection formed on said rod to be engaged for the operation of the rod, all of said elements being connected to and supported solely by the yoke.

In testimony whereof I affix my signature in presence of two witnesses.

HENRY WILSON.

Witnesses:
JOHN WILSON,
THOMAS C. TAGGART.

Copies of this patent may be obtained for five cents each, by addressing the "Commissioner of Patents, Washington, D. C."